United States Patent [19]

Micall

[11] Patent Number: 5,717,758
[45] Date of Patent: Feb. 10, 1998

[54] WITNESS-BASED CERTIFICATE REVOCATION SYSTEM

[76] Inventor: Silvio Micall, 459 Chestnut Hill Ave., Brookline, Mass. 02146

[21] Appl. No.: 763,536

[22] Filed: Dec. 9, 1996

Related U.S. Application Data

[63] Continuation-in-part of Ser. No. 636,854, Apr. 23, 1996, Pat. No. 5,604,804, which is a continuation-in-part of Ser. No. 741,601, Nov. 1, 1996. Related U.S. Application Data

[60] Provisional application No. 60/025,128, Aug. 29, 1996, and provisional application No. 60/024,786, Sep. 10, 1996.

[51] Int. Cl.$^6$ ............................... H04L 9/00; H04L 9/30
[52] U.S. Cl. ............................... 380/25; 380/23; 380/30; 380/49
[58] Field of Search ............................... 380/23, 25, 29, 380/30, 49

[56] References Cited

U.S. PATENT DOCUMENTS

| | | | |
|---|---|---|---|
| Re. 34,954 | 5/1995 | Haber et al. | 380/49 |
| 4,943,707 | 7/1990 | Boggan . | |
| 5,136,646 | 8/1992 | Haber et al. | 380/49 |
| 5,136,647 | 8/1992 | Haber et al. | 380/49 |
| 5,315,657 | 5/1994 | Abadi et al. . | |
| 5,340,969 | 8/1994 | Cox . | |
| 5,396,624 | 3/1995 | Campbell, Jr. . | |
| 5,434,919 | 7/1995 | Chaum . | |
| 5,450,493 | 9/1995 | Maher | 380/30 |
| 5,497,422 | 3/1996 | Tysen et al. . | |
| 5,537,475 | 7/1996 | Micali | 380/30 |
| 5,606,617 | 2/1997 | Brands | 380/30 |
| 5,615,268 | 3/1997 | Bisbee et al. . | |

OTHER PUBLICATIONS

Menezes A. J., *Handbook of Applied Cryptography*, 1996, pp. 566, 576–577, 588–589, 706, 716, 720, 728–729, 737 and 751.

CygnaCom Solutions, Inc., "Federal Public Key Infrastructure (PKI) Technical Specifications Part D—Interoperability Profiles," Published on the World Wide Web, Sep. 27, 1995, 91 pages.

Nazario, N., "Federal Public Key Infrastructure (PKI) Version 1 Technical Specifications: Part B—Technical Security Policy," Published on the World Wide Web, Mar. 13, 1996, 20 pages.

Polk, W., editor, "Federal Public Key Infrastructure (PKI) Technical Specifications (Version 1) Part A: Requirements," Published on the World Wide Web, Dec. 6, 1996, 18 pages.

Ford, Warwick, "A Public Key Infrastructure for U.S. Government Unclassified but Sensitive Operations," Published on the World Wide Web, Sep. 1, 1995, 93 pages.

Chokhani, Santosh, et al., "Certificate Policy and Certification Practice Statement Framework", Published on the World Wide Web, Nov. 3, 1996.

Burr, William E. et al., "A Proposed Federal PKI Using X.509 V3 Certificates," Published on the World Wide Web.

Burr, W.E., "Public Key Infrastructure (PKI) Technical Specifications (Version 1): Part C—Concept of Operations," Published on the World Wide Web, Feb. 12, 1996, 30 pages.

Ford, Warwick, "Public–Key Infrastructure Standards," Published on the World Wide Web, Oct. 1996, 15 printed pages.

Polk, William T., "Minimum Interoperability Specifications for PKI Components," Published on the World Wide Web, Nov., 1996.

Chokhani, Santosh, "Security Considerations in Using X.509 Certificates," Published on the World Wide Web.

Dodson, Donna F., "NIST PKI Implementation Projects," Published on the World Wide Web.

Burr, William, "A Proposed Federal PKI Using X. 509 V3 Certificates: The NISSC Presentation," Published on the World Wide Web.

Farrell S., et al., "Internet Public Key Infrastructure Part III: Certificate Management Protocols," Published on the World Wide Web, Dec. 1996, 83 printed pages.

Nazario, Noel et al., "Management Model for the Federal Public Key Infrastructure," Published on the World Wide Web, Oct. 24, 1996.

Nazario, Noel A., "Security Policies for the Federal Public Key Infrastructure," Published on the World Wide Web, Oct. 24, 1996.

Burr, William, et al., "MISPC: Minimum Interoperability Specifications for PKI Components," Published on the World Wide Web, Dec. 2, 1996.

Elgamal, et al., *Securing Communications on the Intranet and Over the Internet*, Netscape Communications Corporation, Jul. 1996.

*Primary Examiner*—Bernarr E. Gregory
*Attorney, Agent, or Firm*—Foley, Hoag & Eliot,LLP

[57] ABSTRACT

An intermediary provides certificate information by receiving from a first other entity authenticated certificate information, processing at least a portion of the authenticated certificate information to obtain deduced information, if the deduced information is consistent with the authenticated certificate information, having a witness construct authenticated deduced information by authenticating at least one of: the deduced information, the deduced information together with date information, and the deduced information together with additional information, and by providing the authenticated deduced information. The date information may be at least one of: the current date and date information of the authenticated certificate information. The witness may do the processing. The witness may be the intermediary. The authenticated certificate information and/or the authenticated deduced information may include a digital signature, which may be relative to a verification key that is part of an issued certificate and/or may be computed by applying a one-way function to one or more secret values or by iterating a one-way function. The digital signature may keep the witness accountable for the fact that the authenticated deduced information is consistent with the authenticated certificate information.

85 Claims, No Drawings

WITNESS-BASED CERTIFICATE REVOCATION SYSTEM

This application is a continuation in part of U.S. patent application No. 08/636,854, filed on Apr. 23, 1996, now U.S. Pat. No. 5,604,804, and is based on U.S. provisional patent application No. 60/025,128 filed on Aug. 29, 1996 and on U.S. provisional patent application No. 60/024,786 filed on Sep. 10, 1996, and is also a continuation in part of U.S. patent application No. 08/741,601, filed on Nov. 1, 1996, which is based on U.S. provisional application No. 60/006,143, filed on Nov. 2, 1995.

TECHNICAL FIELD

The present invention relates generally to secure communications and more particularly to schemes for certificate management.

BACKGROUND OF THE INVENTION

In many settings, it is useful to certify data, as well as to revoke data that was previously certified. For instance, in a Public Key Infrastructure (PKI), it may be useful to certify users' public keys. Such certification may be provided in the form of a certificate which contains the certified data and vouches authenticity of the certified data.

In a digital signature scheme, each user U chooses a signing key $SK_u$ and a matching verification key, $PK_u$. User U uses $SK_u$ to compute a digital signature of a message m, $SIG_u(m)$, while anyone knowing that $PK_u$ is U's public key can verify that $SIG_u(m)$ is U's signature of m. Finding $SIG_u(m)$ without knowing $SK_u$ is practically impossible. On the other hand, knowledge of $PK_u$ does not give any practical advantage in computing $SK_u$. For this reason, it is in U's interest to keep $SK_u$ secret (so that only he can digitally sign for U) and to make $PK_u$ as public as possible (so that everyone dealing with U can verify U's digital signatures). At the same time, in a world with millions of users, it is essential in the smooth flow of business and communications to be certain that $PK_u$ really is the legitimate key of user U. To this end, users' public keys are often "certified" by a certificate that serves as proof that U is the legitimate owner of $PK_u$. At the same time it is also useful to be able to revoke some of the already-issued certificates when U is no longer the legitimate owner of $PK_u$ (for whatever reason) and/or when $SK_u$ has been compromised. Of course, the need for certification and certificate revocation extends beyond certifying public keys.

In many instances, certificates for users' public keys are produced and revoked by certifying authorities called CA's. A complete public key infrastructure may involved other authorities (e.g., PCAs) who may also provide similar services (e.g., they may certify the public keys of their CA's). The present discussion can be easily applied to such other authorities in a straight-forward manner.

A CA may be a trusted agent having an already certified (or universally known) public key. To certify that $PK_u$ is U's public key, a CA typically digitally signs $PK_u$ together with (e.g., concatenating it with) U's name, a certificate serial number, the current date (i.e., the certification or issue date), and an expiration date. The CA's signature of $PK_u$ is then inserted in a Directory and/or given to U himself. Note that, before certifying U's public key, it is necessary to perform additional steps, such as properly identifying user U. However, these additional steps are optional.

Upon receiving the (alleged) digital signature of user U of a message M, $SIG_u(M)$, a recipient R needs to obtain a certificate for $PK_u$. In fact, $SIG_u(M)$ may be a correct digital signature of M with respect to some public key $PK_u$, but R has no guarantee that $PK_u$ is indeed U's public key. Recipient R may obtain this certificate from the Directory, or from his own memory (if he has previously cached it), or from U himself. Having done this, R verifies (1) the correctness of the CA's certificate for $PK_u$ with respect to the CA's public key, and (2) the correctness of $SIG_u(M)$ with respect to $PK_u$. If the CA's public key is not universally known, or cached with R, then a certificate for the CA's key may also be obtained.

Certificate retrieval is thus possible, although not necessarily cheap. Unfortunately, however, this is not the only retrieval that R needs to do. In addition, it is important that R makes sure that the certificate for $PK_u$ has not been revoked. This check, of course, may not be needed after the certificate's expiration date, but may be needed during the certificate's alleged lifetime. A user's certificate can be revoked for a variety of reasons, including key compromise and the fact that the user is no longer associated with a particular CA.

To enable a recipient to establish whether a given certificate has been revoked, it is known to have each CA periodically issues a Certificate Revocation List (CRL for short). A CRL may consist of the issuer's digital signature of a header comprising the issuer's name (as well as the type of his signature algorithm), the current date, the date of the last update, and the date of the next update, together with a complete list of revoked certificates (whose date has not yet expired), each with its serial number and revocation date. Since it is expected that a CA revokes many certificates, a CRL is expected to be quite long. It is envisaged that the CRL is provided to a Directory who may then distribute the CRL to end users.

After performing some checks on the CA's CRL (e.g., checking the CA's digital signature, checking that the CRL has arrived at the expected time, that a certificate declared revoked in the previous CRL of that CA—and not yet expired—still is revoked in the current CRL, etc.), the Directory stores it under the name of the CA.

When a user queries the Directory about the revocation of a certificate issued by a given CA, the Directory responds by sending to the user the latest CRL of that CA. The user can then check the CRL signature, the CRL dates (so as to receive a reasonable assurance that he is dealing with the latest one), and whether or not the certificate of interest to him belongs to it.

While CRLs are quite effective in helping users establishing which certificates are no longer deemed valid, they are also extremely expensive, because they tend to be very long and need to be transmitted very often.

The National Institute of Standard and Technology has tasked the MITRE Corporation to study the organization and cost of a Public Key Infrastructure (PKI) for the Federal Government. This study estimates that CRLs constitute by far the largest entry in the Federal PKI's cost list. According to MITRE's estimates/assumptions, in the Federal PKI there are about three million users, each CA serves 30,000 users, 10% of the certificates are revoked (5% because of key compromise and 5 % because of change in affiliation with the organization connected to a given CA). CRLs are sent out bi-weekly, and the recipient of a digital signature requests certificate information 20 % of the time (assuming that the remaining 80 % of the time he will be dealing with public keys in his cache). The study envisages that each revoked certificate is specified in a CRL by means of about 9 bytes: 20 bits of serial number and 48 bits of revocation date. Thus, in the Federal PIG, each CRL is expected to comprise thousands of certificate serial numbers and their revocation dates; the header, however, has a fixed length, consisting of just 51 bytes.

At two cents per kilobyte, the impact of CRL transmission on the estimated yearly costs of running the Federal PKI is stunning: if each federal employee verifies one hundred digital signatures per day on average, then the total PIG yearly costs are $10,848 million of which $10,237 million is due to CRL transmission. If each employee is assumed to verify just five digital signatures a day on average, then the total PIG yearly costs are $732 million, of which 563 million is due to CRL transmission.

The MITRE study thus suggests that any effort should be made to find designs alternative to and cheaper than conventional CRL's. One alternative is found in a November 1995 article by the applicant of the present application, which describes adding a special field in a certificate that facilitates handling revocation by making it possible to determine whether a give certificate is valid or revoked without having to prove the revocation status of all certificates.

A similar system is proposed in the "Final Text of Draft Amendments DAM 4 to ISO/IEC 9594-2, DAM 2 to ISOfIEC 9594-6, DAM 1 to ISO/IEC 9495-7, and DAM 1 to ISO/IEC 9594-8 on Certificate Extensions". That document discusses using "distribution points" to indicate a source of CRL information for each certificate. A distribution point is a new quantity that a CA certifies within a certificate. This new quantity allows one to prove whether a given certificate is valid or revoked without proving the validity of all certificates. In fact, certificate revocation is proved relative to this new quantity, and if a certificate has a new quantity X and another certificate has a new quantity Y, then it is possible to prove the validity of the first certificate without also proving the validity of the second certificate; in fact, the revocation information about the first certificate is verified using the quantity X and the revocation information about the second certificate is verified using the quantity Y. In fact, revocation information about a certificate having a distribution point, X, can be found within a CRL having a distribution point that is also X. This reduces a single CRL to a number of smaller CRLs. Thus, using distribution points introduces a new field in the certificate so as to be able to provide more efficient certificate revocation information.

A system that certifies a new field within a certificate is described in a technical report by Dr. Silvio Micali rifled "Enhanced Certificate Revocation System". The system described therein adds a one hundred bit field to a certificate to facilitate certificate revocation. The CA periodically releases a one hundred bit value that, when verified along with the one hundred bit field of the certificate, proves that the certificate is valid and/or revoked.

Other techniques have been developed for decreasing CRL costs. One such technique involves using so-called "delta CRLs" in which a user receives, at every CRL update, a CA-signed list of all the certificates revoked since the last CRL. Thus such a user receives less bits than an entire CRL, but he receives them whether he needs them or not.

These and other prior-art techniques, however, have some inherent limitations. In essence, the CA packages certificate information in various formats that are provided by the directories to the users. Nonetheless, the possibility still remains that the revocation information actually needed by the user is NOT "compatible" with the chosen formats, so that, in order to retrieve it, the user also gets excessive information. This excess of information (e.g., receiving in a CRL information proving that other, irrelevant certificates have been revoked) translates in substantial transmission and storage costs for the users.

However, if the prior art may do away with some storage costs, these cost savings do not apply to transmission costs. Indeed, to inspect a CA-signed CRL, for example, a user must first receive this lengthy document. Only then can he decide not to store it, trusting that, if needed, he could get it again from the Directory or from the original CA.

SUMMARY OF THE INVENTION

According to the present invention, an intermediary provides certificate information by receiving from a first other entity authenticated certificate information, processing at least a portion of the authenticated certificate information to obtain deduced information, if the deduced information is consistent with the authenticated certificate information, having a witness construct authenticated deduced information by authenticating at least one of: the deduced information, the deduced information together with date information, and the deduced information together with additional information, and by providing the authenticated deduced information.

According further to the present invention, an intermediary provides certificate information by receiving from a first other entity authenticated certificate information, processing at least a portion of the authenticated certificate information to provide deduced information, if the deduced information is consistent with the authenticated certificate information, having a plurality of witnesses construct authenticated deduced information by authenticating at least one of: the deduced information, the deduced information together with date information, and the deduced information together with additional information, and providing the authenticated deduced information. One of the witnesses may be the intermediary. Processing at least a portion of the authenticated certificate information may be performed by each of the witnesses. At least two of the witnesses may produce a digital signature which may then be combined into a single digital signature.

According further to the present invention, an intermediary provides certificate information by receiving from a first other entity authenticated certificate information, processing at least a portion of the authenticated certificate information to provide deduced information, if the deduced information is consistent with the authenticated certificate information, having a plurality of witnesses contribute to authenticating at least one of: the deduced information, the deduced information together with date information, and the deduced information together with additional information, and providing the authenticated deduced information. At least two of the witnesses may have a portion of a secret signing key. Two of the witnesses may contribute a digital signature of at least one of: the deduced information, the deduced information together with date information, and the deduced information together with additional information. The digital signatures of at least two of the witnesses may be combined into a single digital signature. A t out of n digital signature scheme may be used to combine the digital signatures where t may equal n.

The date information may be at least one of: the current date and date information of the authenticated certificate information. The witness may do the processing. The witness may be the intermediary. The authenticated certificate information and/or the authenticated deduced information may include a digital signature, which may be relative to a verification key that is part of an issued certificate and/or may be computed by applying a one-way function to one or more secret values or by iterating a one-way function. The digital signature may keep the witness accountable for the fact that the authenticated deduced information is consistent with the authenticated certificate information.

The intermediary and/or the witness may cause the authenticated information to be saved in order to prove that the deduced information is consistent with authenticated certificate information. The witness may determine if the deduced information is consistent with the authenticated certificate information.

Processing the authenticated certificate information may include extracting identifiers of revoked certificates from the authenticated certificate information and providing the deduced information by dividing the identifiers of the revoked certificates into a plurality of lists, where each of the lists includes all identifiers between a first value and a second value. The identifiers may include serial numbers and/or user names.

Processing the authenticated certificate information may include extracting an identifier of a revoked certificates from the authenticated certificate information and providing an indication that the identifier corresponds to a revoked certificate. Alternatively, processing the authenticated certificate information may include deducing from the authenticated certificate information that a certificate is currently valid and providing an indication that the certificate corresponds to a valid certificate.

The authenticated certificate information may relate to a plurality of certificates and processing may include obtaining the deduced information by determining that a proper subset of the certificates has been revoked. The authenticated certificate information may relate to a plurality of certificates and processing may include obtaining the deduced information by determining that a proper subset of the certificates are valid. The authenticated certificate information may relate to a plurality of certificates and processing may include obtaining the deduced information by determining which of a proper subset of the certificates are valid and which of a proper subset of the certificates are revoked.

Processing the authenticated certificate information may include obtaining the deduced information by identifying all of the revoked certificates sharing a given characteristic and the additional information may include an indication of the characteristic. The characteristic may include having a certificate identifier between two given values or may include a distribution point that is assigned by an issuing authority when a certificate is created.

The authenticated certificate information may indicate a verification key of a certificate, the deduced information may indicate that the certificate is valid, and providing the authenticated deduced information may include producing a digital signature relative to the verification key to prove that the certificate is valid. The authenticated certificate information may include at least one of:indication of issued certificates and indication of revoked certificates. The indication of revoked certificates may include a CRL.

The authenticated certificate information may include at least one of:information indicating issued certificates and information indicating certificates that should no longer be issued, and the authenticated deduced information may indicate that at least one certificate is valid. The authenticated deduced information includes at least one reissued certificate indicating that a certificate is valid and/or indicating that the validity period of a certificate has been modified. The authenticated certificate information may include at least one of:information indicating issued certificates and information indicating certificates that should be reissued, and the authenticated deduced information may include at least one reissued certificate indicating that the reissued certificate is valid and/or that a validity period for the certificate has been modified.

The authenticated certificate information may include at least one of:information indicating issued Certificates and information indicating currently valid certificates and the deduced information may indicate that at least one certificate is revoked. The authenticated certificate information may include at least one of:information indicating revoked certificates and information indicating valid certificates and the deduced information may indicate that at least one certificate is issued.

The witness may use tamper-proof hardware. The tamper-proof hardware may have a signing key used to authenticate the deduced information. The tamper-proof hardware may be implemented using a single integrated circuit.

A second other entity may determine if the deduced information is consistent with the authenticated certificate information. The second other entity may provide the witness with an indication that the deduced information is consistent with the authenticated certificate information. The authenticated deduced information may be provided in response to a query. The query may include of a program that operates on the authenticated certificate information. The query may be encrypted. The intermediary may not be able to identify a source of the query. The additional information may include an indication of the query, which may be a one-way hash of the query.

The deduced information may contain less bits that a smallest piece of certificate information that is usable for obtaining the deduced information and the certificate information may be information that is authenticated in the authenticated certificate information. The deduced information may be different from any piece of certificate information that is usable for obtaining the deduced information and the certificate information may be information that is authenticated in the authenticated certificate information.

The intermediary may not revoke certificates and/or issue certificates. The first other entity may be a certification authority. The deduced information may be authenticated by being posted in a read-only fie that is writable only by at least one of:the witness and the intermediary.

The authenticated certificate information may include a hierarchical certificate and the authenticated deduced information may include a reissued certificate. The reissued certificate may include at least one of: a digital signature of the witness and a digital signature of the witness together with a certificate for a public key of the witness. The reissued certificate may expire when the hierarchical certificate expires. The reissued certificate may contain less bits than the hierarchical certificate. The reissued certificate may contain less hierarchical certificate information than the hierarchical certificate. The reissued certificate may not contain at least one digital signature contained in the hierarchical certificate. The reissued certificate may be verifiable by verifying the signatures of less authorities than the hierarchical certificate. The reissued certificate may be verifiable relative to a universally known public key by verifying the signatures of less authorities than the hierarchical certificate. The reissued certificate and the hierarchical certificate may be verifiable relative to the same universally known public key.

The authenticated deduced information may be provided in response to a query of a user. At least a portion of the query may be hidden from the intermediary and/or may be encrypted with a key of the tamper-proof hardware. The query may relate to one or more certificates, and at least one serial number of the one or more certificates may be encrypted with the key of the tamper-proof hardware. The query may include an indication of a key of the user which may be encrypted with the key of the tamper-proof hardware. At least a portion of the authenticated deduced information may be encrypted with the key of the user. At least a portion of the query may remain hidden from the intermediary when the authenticated deduced information is provided.

DETAILED DESCRIPTION OF THE PREFERRED EMBODIMENTS

The following shows how to use directories, intermediaries, and other entities in a convenient and reliable Witness System that enables users to save transmission costs of certificate information. Note that an intermediary can a directory, an authority, a user, or another entity .(or a collection of entities) that provide certificate information to users. In particular, an intermediary could be a machine or a computer file available to users.

In one embodiment, CAs regularly send intermediaries CA-authenticated information such as issued certificates and CRLs (preferably all digitally signed and dated). A user requests information from the intermediary about a specific certificate C by, for instance, specifying CA and serial number of certificate C. Then, the intermediary consults the CA-signed record to deduce whether C is currently valid, or revoked, (or ever issued, for that matter), and then authenticates (e.g., digitally signs) and provides to the user the authenticated deduced information. Notice, therefore, that in such a system, the certification authorities retain power to issue and revoke certificates, while the intermediary acts as a witness of the CA decisions. Such a witness, however, is kept accountable for the deduced information the witness provides to a user by virtue of the witness authenticating the deduced information. Thus, it is not in the interest of an intermediary to provide false authenticated information to a user because the user may save the authenticated deduced information to prove that the intermediary provided false information. At the same time, the intermediary may save the CA-signed information that was used to obtain the deduced information provided to the user. This way, the intermediary may prove that the deduced information provided to a user is consistent with information provided by the CA.

More generally, in a witness system, authenticated certificate information is received from a first other entity and at least a portion of the information is processed to obtain deduced information. If the deduced information is consistent with the authenticated certificate information, a witness authenticates the deduced information (possibly together with additional information, such as date information, information about the witness, information about the authentication process, etc.). Note that the deduced information may contain less bits than the authenticated certificate information used to obtain the deduced information. Note also that the deduced information may be different than any portion of the authenticated certificate information because the requestor of the deduced information requires or desires to receive authenticated information different from the authenticated certificate information.

In a preferred embodiment, the deduced information is information other than the information that is authenticated in the authenticated certificate information. The following examples illustrate. For instance, the authenticated certificate information may consist of (1) the set S of all not-expired certificates issued by a given CA and (2) the latest CRL of the CA; while the deduced information may consist of an indication that two given certificates of the CA have been revoked and a third certificate of the CA is still valid (up to the CRL date). In fact the latter information, though deducible from the above CA-signed dam, was not digitally signed by the CA and hence was not part of the authenticated certificate information. As for another example, the authenticated certificate information may be the same as above, while the deduced information indicates that a given certificate C in S is valid. Though C is an explicit part of the authenticated certificate information, the state of C's validity is not, even though such information is deducible from the authenticated certificate information. Indeed, even if the witness digitally signs C, or the data certified in C, together with a later (with respect to C) date D to signify that C is valid up to D, the digital signature of the witness constitutes authenticated deduced information. In fact, C by itself does not convey information about its own validity at date D. Only C together with a CRL (or some other suitable information) can such a validity be deduced. As another example, assume that, at a later date D, the witness digitally signs only the data certified in C. Then, if it is understood that the witness does so only to indicate that the validity period of such data has been modified (e.g., extended if, for instances, C has already expired) or to indicate that C is still valid (if, for instance, C is not yet expired), then the witness' signature constitutes authenticated deduced information.

The advantage of such witness system is that, while an intermediary may make use of lengthy documents (such as CRLs) in order to respond to a query, the intermediary provides the user with much shorter answers. For instance, a intermediary may make use of a 200,000-bit CRL, but provide the user with a 1,000-bit signature authenticating the status of a Single certificate in response to the query of the user. Alternatively, the intermediary may use a CRL or authenticate information about a given set of certificates to deduce and authenticate the status of a proper subset of the certificates. (A proper subset is a non-empty subset that is less than an entire set).

Alternatively, the CA may send the intermediary no CRLs. For instance, the CA may just send issued certificates and some other indication as to which certificates are revoked (e.g., notification of each individual certificate revocation or small groups of identifiers of revoked certificates). Preferably, the CA sends the information in an authenticated manner. The intermediary may use the information to provide deduced certificate information which is then authenticated. Note that the authenticated deduced information may be any type of certificate information. For instance, the intermediary may use authenticated information from the CA to construct a CRL.

Alternatively, a CA may issue only short-lived certificates (e.g., certificates that expire on the same day of issuance) that do not need to be explicitly revoked. The CA indicates (e.g. daily) to the intermediary (preferably in an authenticated manner) which of the certificates should be reissued. In this case, the authenticated deduced information provided by the intermediary may include the reissued certificate. For instance, the intermediary may reissue a certificate by digitally signing information already in the certificate (e.g., in the case of a public-key certificate, the public key, the user name, etc.) together with the current date, and possibly indications of the current issuer and/or the CA that causes the issuance. In particular, the intermediary may produce a digital signature proving that a given certificate is valid wherein the digital signature is relative to a public key that is authenticated within the certificate itself. Each digital signature could make the certificate valid for a short amount of time (such as one day). The CA may indicate to the intermediary that a certificate should be deemed valid for a longer period (e.g., one week). In this case the intermediary may, daily for seven days, provide a digital signature that indicates that the certificate is valid. Alternatively, the intermediary may produce a single digital signature that proves that the certificate is valid for seven more days. Note that, in this case too, the CA retains control of which certificates are issued, valid, revoked, etc. and the directory acts as a witness of decisions of the CA.

The authenticated deduced information may be provided to the intermediary to the user even if there is no specific request for the information. For instance, the intermediary may periodically update the user with the authenticated deduced information.

When an intermediary provides authenticated deduced information in response to a query, then it is useful that the intermediary also authenticates the query and provides the authenticated query with the response. For instance, the intermediary may provide a digital signature of an indication of the query together with the deduced information that responds to the query. One such indication of a query may, for instance, consist of a one-way hash of the query. Including such an authenticated query enhances the accountability of the intermediary and allows for more compact deduced information. For instance, a query may consist of a list of K certificate identifiers and the response by the intermediary may be a digital signature of the one-way hash of the K identifiers (in the order in which the identifiers were received) together with a K-bit string S, where the ith bit of S is one if the ith identifier corresponds to a valid certificate and is zero otherwise.

A user query need not be as simple as asking whether a given sequence of certificates is valid. For instance, a user may inquire about all certificates revoked by a given CA in a given two day interval. In .that case, the set of certificates the user is asking about may not be known in advance to the user. Nonetheless, the set is implicitly specified by the user's query and may be easily answered by the intermediary without introducing irrelevant information in the response. More generally, a query may consist of program to be executed on the CA-authenticated certificate information that specifies the information of interest to the user.

This approach may thus do away with any excess of information. User queries may be answered in a "minimalist" way, no matter what set of certificates the user may be interested in. Notice too that the format in which the CA conveys information to the intermediary is not too relevant, provided that it is sufficient for answering user requests.

An intermediary may access information authenticated only by a CA or may access information authenticated by other entities. The authenticated information may be from more than one source, such as multiple CA's, multiple entities, or some combination thereof.

In an alternative embodiment, an intermediary may be implemented using tamper-proof hardware or the intermediary may simply make use of tamper-proof hardware. Tamper-proof hardware may include a device that is protected so that contents of portions of the device can not be examined or altered. Such a tamper-proof device may contain a secret signing key so that the authenticated deduced information of an intermediary may consist of a digital signature of the deduced information produced by the tamper-proof device. To guarantee that the deduced information is consistent with the CA-authenticated information, the CA-authenticated information may be fed to the tamper-proof device which contains means for verifying the CA-authenticated information and providing the deduced information. For instance, in response to a query asking whether a given serial number corresponds to a valid certificate, the query and the relevant CRL (signed by the CA) are input to the tamper-proof device. The tamper-proof device then verifies the CA's signature of the CRL and determines the queried serial number is in the CRL. The tamper-proof device computes and outputs a signed indication of the status of the certificate corresponding to queried serial number. The response by the tamper-proof device may include the date of the CRL used to determine the response. If the digital signature of the CRL is not correct (or if the CRL is not up-to-date), then the tamper-proof device may not produce a response. Note that the tamper-proof device may not have sufficient memory capacity to store the entire CRL simultaneously. However, if the digital signature of the CRL is applied to a one-way hash of the contents of the CRL, and if the one-way hash is computed by executing a function on the CRL sequentially, then the tamper-proof device may simply read and store at one time as much of the CRL needed to compute the function. After computing the hash, the tamper-proof device may then verify the signature of the CA.

The feasibility and the cost effectiveness of intermediaries with tamper-proof hardware make such intermediaries appealing in several scenarios. In addition, intermediaries with tamper-proof hardware make it possible for a user to query about some certificate information to the intermediary without revealing what the queried information may be if the query information is processed in the tamper-proof portion.

For instance, assume that a user wishes to make a query about a single certificate, and that hiding just the serial number is deemed appropriate to the user. In that case, the user's individual query may specify the CA in the clear and, addition, encrypt the serial number with a key of the secure-hardware (e.g., a public key). Note that if the user key is already known or easily obtainable by the tamper-proof hardware, then there is no need to specify the user within the query. Also, if the user key is a public key, then the user key may be specified in the clear.

The intermediary may input a CA-authenticated CRL to the tamper-proof hardware. The hardware may then decrypt, for instance, a serial number from the query and deduce the correct response using the CRL, encrypt the response with the user key, sign the encrypted response, and output the result. (If encryption with the response key is deemed sufficient authentication that the answer comes from the secure hardware, then the signature step could be skipped. Alternatively, the hardware may first sign the answer and then sign the result. Alternatively yet, the hardware may sign both inside and outside the encryption layer.) Thus, the intermediary (or an eavesdropper for that matter) never learns the queried serial number.

Note that, if an intermediary consists of tamper-proof hardware only, then encrypting a query with a key of such a device may still be useful against eavesdroppers since having such a device fully learn the query may not matter if there are no instructions that reveal the query to the outside, or if the query can not be extracted from the device.

Alternatively, rather than specifying the CA in the clear, the user may specify the CA within the encrypted query. In this case, the secure hardware is used to specify the CA to the intermediary. Also the system described herein may make the CA's identify "invisible" to possible eavesdroppers: if the hardware learns the CA's identity with an intermediary key, or if the communication lines between the hardware and the CA cannot be eavesdropped upon (e.g., because the lines are "internal" or protected).

It is also possible to use tamper-proof hardware to hide the CA's identity from the intermediary. For instance, the CA's identity may be specified within the query encrypted with the key of the tamper-proof hardware. Thus, after learning the CA's identity and the user's request, the tamper-proof hardware may request from the intermediary the latest CRLs of two or more CAs even though only one of the CAs has issued the certificate(s) of interest. Of course, after receiving these CKLs, the hardware may ignore the unused CRLs when computing the response.

More generally, secure hardware may be used simply to obtain CA-signed certificate information, but without having the intermediary learn exactly what information was requested an&or provided. For instance, the encrypted query may be about the latest CRL of a given CA, and the tamper-proof hardware may ask the intermediary for the latest CRLs of three different CAs. Then, the tamper-proof hardware may encrypt only the CRL of interest (or all three CRLs) with a user key. Notice that both the length of the query and that of the answer may be extended with padding.

Also the identify of the querying user can be hidden from the intermediary in the system described herein by combining the system with known techniques such as those described in Chaum's article rifled "Untraceable Electronic Mail, Return Addresses and Digital Pseudonyms".

In an alternative embodiment, deduced information may be authenticated by a number of different intermediaries, each individually signing the deduced information. The user may then verify the intermediaries' digital signatures and the fact that their answers are equal or equivalent. To facilitate the verification that a query about a set of certificates result in identical answers from different intermediaries, one may adopt proper encodings and standards for intermediary answers. For instance, all certificates in the set may be answered one by one, or are answered collectively. The user may then be assured that the query has been answered correctly by verifying that at least a given number of intermediary (e.g., all intermediaries) have answered the query and that the answers provided by the given number of intermediaries are consistent. If intermediaries are chosen with trustworthiness criteria in mind, the chance that a number of intermediaries may collude against the user or lie in the same way can be taken to be negligibly small. Furthermore, one should realize that there is plenty of evidence about the certificate status of a given certificate; in particular, other users may be in possession of CA-signed documents relative to the status, and the CA's themselves could be consulted about the status (e.g., in a litigation). Thus, an intermediary that lies cannot do so with impunity. Note that there may be any number of intermediaries, such as two, three, four or five.

It should also be realized that the intermediaries may have various degrees of independence. For instance, it may be that each intermediary has an independent data-base, and receives data-base information only from the CAs, either directly or indirectly. Alternatively, it may be that two or more of the intermediaries may be entities who have access to a common data-base containing CA-signed information.

Whether or not the intermediaries are dependent in some fashion and/or access some of the same information, it may be convenient that a user addresses his own queries to a specific intermediary who will then obtain (at least some of) the answers signed by other intermediaries, and then send those answers to the user. Such a specific intermediary may actually add to or replace some of the other intermediaries' answers and then sign the modified answers.

The intermediaries may use threshold signatures so that a user obtains a single signature (rather than k signatures) that proves that at least t out of n intermediaries have approved a given answer to a user query. In particular, it is possible to ensure that t=n, that is, that all intermediaries approve a given answer. This signature savings can be made, depending on the system used, by the user, by one or more intermediaries, by some other entity, or by a mixture of the above.

For further security or privacy, requests by a user may be made anonymously, or encrypted, in a way that allows only certain intermediaries (or the equipment of certain intermediaries, such as their computer or special pieces of hardware—such as certain protected chips of theirs) to decrypt the requests. Similarly, answers may be encrypted in a user's key or encrypted in some other fashion. It is also possible to hide the identity of the users from the intermediaries.

Digital signatures or other types of digital authentications may be used to authenticate information. Some types of authentication may not require any additional steps if, for instance, secure communication channels are used. The system described herein allows for billing the user for responding the user's queries.

Note that a traditional CA-signed certificate showing that a given public key PK belongs to a user U can be very long if it is accompanied by or incorporates a certificate for the public key relative to which the CA signs the certificate. In fact, the public key may not be universally known, and thus needs to be certified, so that the public key may be trusted by a verifying user. Such a certification may involve an hierarchical procedure: the public key of the signing CA, PK1, is further signed by another (preferably higher) authority relative to another public key, PK2. If PK2 is not universally known, then PK2 is signed by a yet another authority relative to a yet another public key PK3. The procedure is continued until a signature is produced relative to a public key PKn that is sufficiently known (e.g., known by the receiver of the certificate). Such hierarchical certificates, therefore, are quite long.

The witness-based systems discussed herein provides a mechanism for obtaining shorter certificates in which a hierarchical certificate for a given public key includes authenticated certificate information that is verified by one or more witnesses (possibly making use of one or more tamper-proof devices). See U.S. patent application No. 08/636,854, filed on Apr. 23, 1996, which is incorporated by reference herein, now U.S. Pat. No. 5,604,804. If the hierarchical certificate is verified, then shorter deduced certificate information may be authenticated by reissuing the certificate in a way that dispenses with hierarchical certification altogether or simply uses a subset of the hierarchical certificate (e.g., uses a shallower hierarchy of public keys/ digital signatures).

For example, a witness may directly sign quantities extracted from an original certificate (such as the public key PK, the user U, the expiration date, possibly the original CA, etc.), possibly new quantities (such as a witness identifier, a witness' signing algorithm identifier, etc.), and possibly some modified quantities (such as a shorter expiration date, or a longer expiration date, preferably if so indicated by a proper authority). The signature of the witness may be relative to the witness' public key. If the public key of the witness is universally known, then the reissued certificate is much shorter and can be universally verified. Otherwise, the witness' signature may be accompanied by or incorporate a certificate for the witness' public key, which may be much shorter than the certificate for the public key of the original CA. Indeed, witnesses may be chosen so that the public keys of the chosen witnesses are either universally known or have very short certificates. The shorter certificate may include or be accompanied by the original CA signature and/or some other portions of the original hierarchical certificate.

The compact certificate reissuance system using witnesses can be realized by having the witness use tamper-proof hardware as discussed above, or by having a multiplicity of witnesses (at least some of which may use tamper-proof hardware). If there is a multiplicity of witnesses, they may, for instance, use a threshold digital signature. Alternatively, the digital signatures of at least some of the witnesses may be combined in order to obtain a single digital signature relative to a single public key. (If a "common" public key is used, then it is preferable that the common public key, if not universally known, at least has a short certificate.)

Compact certificate reissuance may be of great value to a public-key infrastructure, because it enables use of much shorter certificates. Indeed, it is possible a specialized company or organization that provides such a service. A shorter reissuance may be desirable to a user because the user may obtain more favorable treatment if certificate provided by the user is shorter. For instance, the user may be charged less for certain transactions or services by having a shorter certificate. Indeed, the certificate for the public key of a signer may need to be stored by the recipients of the signatures, or transmitted with the signatures. Thus, shorter reissued certificates may benefit the signer as well as the recipients of the signatures.

Such witness-based certificate reissuance may also be quite beneficial even if the reissued certificates are not shorter. Indeed, the reissue mechanism described herein may also facilitate adding new formats for certificates (e.g., ones that involve new fields or arrange them differently) or new types of certificates even after a number of certificates using an old format or type have been issued. In this case, rather than having the user contact the original CA (and possibly again need to be identified and so forth), a witness based system can first verify a given type of certificate, and if the verification is correct reissue the certificate as a new-type certificate.

CRL information may be conveyed using smaller structures called Segment CRLs (SCRL for short) by dividing the CRL information into a plurality of subsets where at least one of the subsets has at least a portion thereof authenticated. An SCRL may convey authenticated revocation information about all certificates having a serial number between a lower bound, A, and an upper bound, B. Preferably, the upper and lower bounds are authenticated and preferably are authenticated within the SCRL itself. Thus, one may determine whether a serial number X (where X is between A and B) corresponds to a revoked certificate by simply examining the SCRL having A and B as upper and lower bounds, respectively. For instance, it is possible to have a first SCRL convey revocation information about all certificates having serial numbers between 1 and 1000, a second SCRL convey information about all certificates having serial numbers between 1000 and 2000, etc. Note that it is preferable that the numeric intervals of all the SCRLs cover the entire serial number space (e.g., by overlapping) so that for each serial number X there exists at least one SCRL having an interval that contains X. Of course, SCRLs may be used to convey other information.

The bounds A and B may be identified and/or authenticated without having the bounds explicitly appear in the SCRL (e.g., identified and/or authenticated separately). Alternatively, for instance, if an SCRL provides information about all revoked certificates having a serial number between zero and B, then it is possible to authenticate only the upper bound B within the SCRL if any serial number of an issued certificate is greater than zero. Of course, it is possible for the lower bound of an entire certificate system to be a number other than zero, in which case the lower bound does not need to explicitly appear within the SCRL. Similarly, if a certificate system has an absolute upper bound, there is no need to identify and/or authenticate that absolute upper bound within an SCRL.

Also, the possible upper and lower bounds of an SCRL may be known a priori. Thus, it is possible to assign to each SCRL a progressive number or another identifier. In that case, specifying and/or authenticating the progressive number (or other identifier) is sufficient. Alternatively, assume that segments are a priori chosen to be zero and 1000, 1000 and 2000, etc. In this case, any two elements contained in an SCRL are sufficient to identify the segment of an SCRL. Because such an SCRL authenticates the identifiers of revoked certificates contained therein, the SCRL also automatically authenticates the interval thereof. In sum, therefore, the lower bound and the upper bound of an SCRL may not need to be explicitly identified or authenticated since, in some cases, the bounds may be deduced from the SCRL.

SCRLs may be implemented by using identifiers other than serial numbers. For instance, an SCRL may use identifiers that include the name of the user of each certificate. Alternatively, the identifiers may depend on the identity of the CA, the CA's digital signature of the certificate, certificate versions, certificate serial numbers, certificate algorithm identifiers, certificate public key information, certificate validity, certificate user names, and certificate date information. Preferably, an SCRL also includes a short description of a subset of identifiers about which revocation information is provided.

More generally, an SCRL may facilitate handling certificate revocation information without adding a new quantity or field in the certificates by properly using existing characteristics of conventional certificates, such as the CA's digital signature of the certificate, certificate versions, certificate serial numbers, certificate algorithm identifiers, certificate public key information, certificate validity, certificate user names, and/or certificate date information. A conventional certificate is a certificate that does not contain an additional field used primarily for certificate revocation (e.g., a distribution point field). More generally, a characteristic of a conventional characteristic includes that a function evaluated on at least a portion of the certificate yields a given value. For instance, the function may be a hash function mapping a certificate or a certificate identifier to few bits (e.g., five bits). In this case, each five bit pattern corresponds to a verifiable characteristic of the certificate. It is also possible to choose the function so that each SCRL is expected to contain roughly the same number of revoked certificates.

Alternatively, the characteristics may be chosen so that different SCRL's each contain information corresponding to a different number of revoked certificates. Note that the system disclosed herein allows for dynamic adjustment of the size of each of the authenticated sublists. For example, assume a first sublist corresponds to certificates having serial numbers between B1 and B2, a second sublist corresponds to certificates having serial numbers between B2 and B3, etc. Further assume that many certificates between B1 and B2 (i.e., certificates corresponding to the first sublist) are revoked while relatively few certificates between B2 and B3 (i.e., certificates corresponding to the second sublist) are revoked. In that case, when the first sublist becomes much larger than the second sublist, it is possible to adjust 132 so that the number of certificates contained in the first sublist is roughly equal to the number of certificates contained in the second sublist. In such a case, the new SCRLs may include authenticated versions of the new upper and lower bounds. Alternatively, if there are too many queries about the revocation status of a specific certificate, X, then the authenticated sublist containing X could be distributed too many times. It is this advantageous to make the sublist containing X shorter to, for instance, decrease the number of bits transmitted in the entire system in response to queries. This dynamic adjustment of the characteristics allows adjustment of the CRL sublists in a way that is not possible if assignment to a particular sublist is determined at the time of certificate issuance. Note also that it is possible to dynamically adjust the characteristics used to construct the sublists without increasing the number of sublists.

There may be a plurality of characteristics such that each certificate possesses at least one of the characteristics. Then, for each characteristic, an SCRL is constructed that provides revocation information about all certificates that possess the characteristic. Therefore, it is possible to establish whether a given certificate having a given characteristic has been revoked by examining a single SCRL that contains revocation information about all certificates having the given characteristic.

Note that a characteristic may not need to be explicitly identified or authenticated within an SCRL. Instead, the characteristic may be deduced from the SCRL, for example, by using the data stored in the SCRL. For instance, if the characteristic(s) are known a priori, then the indication of one or more revoked certificates in an SCRL may be sufficient to determine the characteristic relative to the SCRL. Given that the SCRL is authenticated, then by implication the characteristic is also authenticated.

Note that an SCRL facilitates certificate revocation by proving (e.g., using digitally signed data) that a given certificate is valid (1) without also proving the validity/revocation status of all certificates and (2) without requiring a special field or quantity within the certificates.

The intermediary may process the authenticated certificate information and construct one or more SCRL's that are then authenticated to provide authenticated deduced information. In addition, the intermediary may provide authenticated deduced information by authenticating one or more identifiers of revoked certificates without authenticating the revocation dates of the certificates. Alternatively, the intermediary may indicate a revocation date by using a reduced of bits.

It should also be noted that intermediaries can be read-only ties; in particular, read-only fries containing CA-signed certificate information. Therefore, it is possible to make such fries available for consultation to users without enabling them to tamper with the fries. In particular, intermediaries may "post" the intermediaries' digital signatures indicating validity (or revocation) of individual certificates. In fact, while a particular CA may not have the computational power to update, say, every day or hour, the status of all certificates issued by the CA, intermediaries may be computationally much more powerful. In this case, the intermediaries may take the daily or hourly issued information of the CA (e.g., new individual certificates, new individual-certificate revocations, and CRL) and transform the information into a read-only tie containing, separately, the intermediary's own signature about the validity of each individual certificate in a separate manner. For instance, each intermediary may have correspond to a separate read-only file or some intermediaries may store information in a common read-only tie used by more than one intermediary.

It will be appreciated by one of ordinary skill in the art that the system described herein may be applied to public key certificates as well as any other types of certificates that may be revoked. Also, a CA could be any authority. In particular, it is not necessary that such an authority be the authority that issued the certificates being revoked. Note that an intermediary includes a directory, a user, an authority, a computer tie, a read-only tie, a machine, or any entity that causes information to be provided to another entity. Indeed, such an intermediary may receive information and send that information to other users. More generally, the intermediary may simply cause a user to receive information from another entity, such as another user, an other directory, an other intermediary, an other CA, and so forth. For instance, an intermediary could be a computer file that causes users to receive the information stored therein by being accessible to the users. Similarly, the system disclosed herein may be used advantageously by users to receive information about revoked certificates or valid certificates.

It will be appreciated by one of ordinary skill in the art that although the system has been illustrated herein using serial numbers to identify certificates, it is straight-forward to practice the system by using identifiers, other than serial numbers. Such identifiers include a hash (such as a one-way hash) of at least a portion of a certificate or other convention or unconventional ways for identifying a certificate. In particular, a certificate identifier may include the name of the user about which the certificate has been issued (e.g., the owner of a public key in the case of a public key certificate).

While the invention has been disclosed in connection with the preferred embodiments shown and described in detail, various modifications and improvements thereon will become readily apparent to those skilled in the art. Accordingly, the spirit and scope of the present invention is to be limited only by the following claims.

What is claimed is:

1. A method for an intermediary to provide certificate information, comprising the steps of:
   (a) receiving from a first other entity authenticated certificate information;
   (b) processing at least a portion of the authenticated certificate information to obtain deduced information that is not part of the authenticated information;
   (c) if the deduced information is consistent with the authenticated certificate information, having a witness construct authenticated deduced information by authenticating at least one of: the deduced information, the deduced information together with date information, and the deduced information together with additional information; and (d) providing the authenticated deduced information.

2. A method according to claim 1, wherein the date information is at least one of:the current date and date information of the authenticated certificate information.

3. A method according to claim 1, wherein the witness does the processing.

4. A method according to claim 1, wherein the witness is the intermediary.

5. A method according to claim 4, wherein the authenticated deduced information includes a digital signature.

6. A method according to claim 5, wherein the digital signature is relative to a verification key that is part of an issued certificate.

7. A method according to claim 6, wherein the digital signature is computed by applying a one-way function to one or more secret values.

8. A method according to claim 6, wherein the digital signature is computed by iterating a one-way function.

9. A method according to claim 5, wherein the digital signature keeps the witness accountable for the fact that the authenticated deduced information is consistent with the authenticated certificate information.

10. A method according to claim 9, wherein at least one of:the intermediary and the witness cause the authenticated information to be saved in order to prove that the deduced information is consistent with authenticated certificate information.

11. A method according to claim 1, wherein the authenticated certificate information includes a digital signature.

12. A method according to claim 1, wherein the witness determines if the deduced information is consistent with the authenticated certificate information.

13. A method according to claim 1, wherein processing includes the steps of:

(a) extracting identifiers of revoked certificates from the authenticated certificate information; and (b) providing the deduced information by dividing the identifiers of the revoked certificates into a plurality of lists, wherein each of the lists includes all identifiers between a first value and a second value.

14. A method according to claim 13, wherein the identifiers include serial numbers.

15. A method according to claim 13, wherein the identifiers include user names.

16. A method according to claim 1, wherein processing includes the steps of:

(a) extracting an identifier of a revoked certificates from the authenticated certificate information; and (b) providing an indication that the identifier corresponds to a revoked certificate.

17. A method according to claim 1, wherein processing includes the steps of:

(a) deducing from the authenticated certificate information that a certificate is valid; and (b) providing an indication that the certificate corresponds to a valid certificate.

18. A method according to claim 1, wherein the authenticated certificate information relates to a plurality of certificates and wherein processing includes obtaining the deduced information by determining that a proper subset of the certificates has been revoked.

19. A method according to claim 1, wherein the authenticated certificate information relates to a plurality of certificates and wherein processing includes obtaining the deduced information by determining that a proper subset of the certificates are valid.

20. A method according to claim 1, wherein the authenticated certificate information relates to a plurality of certificates and wherein processing includes obtaining the deduced information by determining which of a proper subset of the certificates are valid and which of a proper subset of the certificates are revoked.

21. A method according to claim 1, wherein processing includes obtaining the deduced information by identifying all of the revoked certificates sharing a given characteristic.

22. A method according to claim 21, wherein the additional information includes an indication of the characteristic.

23. A method according to claim 21, wherein the characteristic includes having a certificate identifier between two given values.

24. A method according to claim 21, wherein the characteristic includes a distribution point that is assigned by an issuing authority when a certificate is created.

25. A method according to claim 1, wherein the authenticated certificate information indicates a verification key of a certificate, the deduced information indicates that the certificate is valid, and providing the authenticated deduced information includes producing a digital signature relative to the verification key to prove that the certificate is valid.

26. A method according to claim 1, wherein the authenticated certificate information includes at least one of:indication of issued certificates and indication of revoked certificates.

27. A method according to claim 26, wherein the indication of revoked certificates includes a CRL.

28. A method according to claim 1, wherein the authenticated certificate information includes at least one of:information indicating issued certificates and information indicating certificates that should no longer be issued, and wherein the authenticated deduced information indicates that at least one certificate is valid.

29. A method according to claim 28, wherein the authenticated deduced information includes at least one reissued certificate indicating that the certificate is valid.

30. A method according to claim 28, wherein the authenticated deduced information includes at least one reissued certificate indicating that a validity period of the certificate has been modified.

31. A method according to claim 1, wherein the authenticated certificate information includes at least one of:information indicating issued certificates and information indicating certificates that should be reissued, and wherein the authenticated deduced information includes at least one reissued certificate indicating that the certificate is valid.

32. A method according to claim 1, wherein the authenticated certificate information includes at least one of:information indicating issued certificates and information indicating certificates that should be reissued, and wherein the authenticated deduced information includes at least one reissued certificate indicating that a validity period of the certificate has been modified.

33. A method according to claim 1, wherein the authenticated certificate information includes at least one of:information indicating issued certificates and information indicating currently valid certificates and wherein the deduced information indicates that at least one certificate is revoked.

34. A method according to claim 1, wherein the authenticated certificate information includes at least one of:information indicating revoked certificates and information indicating valid certificates and wherein the deduced information indicates that at least one certificate is issued.

35. A method according to claim 1, wherein the witness uses tamper-proof hardware.

36. A method according to claim 35, wherein the tamper-proof hardware has a secret key used to authenticate the deduced information.

37. A method according to claim 35, wherein the tamper-proof hardware is implemented using a single integrated circuit.

38. A method according to claim 35, wherein the witness is the intermediary.

39. A method according to claim 38, wherein the witness performs the processing step.

40. A method according to claim 35, wherein the witness performs the processing step.

41. method according to claim 35, wherein the authenticated deduced information is provided in response to a query of a user.

42. A method according to claim 41, wherein at least a portion of the query is hidden from the intermediary.

43. A method according to claim 42, wherein at least a potion of the query is encrypted with a key of the tamper-proof hardware.

44. A method according to claim 42, wherein at least a portion of the query remains hidden from the intermediary when the authenticated deduced information is provided.

45. A method according to claim 41, wherein at least a portion of the query is encrypted with a key of the tamper-proof hardware.

46. A method according to claim 45, wherein the query relates to one or more certificates, and at least one serial number of the one or more certificates is encrypted with the key of the tamper-proof hardware.

47. A method according to claim 45, wherein the query includes an indication of a key of the user.

48. A method according to claim 47, wherein the key of the user is encrypted with the key of the tamper-proof hardware.

49. A method according to claim 48, wherein at least a portion of the authenticated deduced information is encrypted with the key of the user.

50. A method according to claim 49, wherein at least a portion of the query remains hidden from the intermediary when the authenticated deduced information is provided.

51. A method according to claim 47, wherein at least a portion of the authenticated deduced information is encrypted with the key of the user.

52. A method according to claim 51, wherein at least a portion of the query remains hidden from the intermediary when the authenticated deduced information is provided.

53. A method according to claim 1, wherein a second other entity determines if the deduced information is consistent with the authenticated certificate information.

54. method according to claim 53, wherein the second other entity provides the witness with an indication that the deduced information is consistent with the authenticated certificate information.

55. A method according to claim 1, wherein the authenticated deduced information is provided in response to a query.

56. A method according to claim 55, wherein the query includes of a program that operates on the authenticated certificate information.

57. A method according to claim 55, wherein the query is encrypted.

58. A method according to claim 55, wherein the additional information includes an indication of the query.

59. A method according to claim 58, wherein the indication of the query includes a one-way hash of the query.

60. A method according to claim 1, wherein the deduced information contains less bits that a smallest piece of certificate information that is unable for obtaining the deduced information wherein the certificate information is information that is authenticated in the authenticated certificate information.

61. A method according to claim 1, wherein the deduced information is different from any piece of certificate information that is usable for obtaining the deduced information wherein the certificate information is information that is authenticated in the authenticated certificate information.

62. A method according to claim 1, wherein the intermediary does not revoke certificates.

63. A method according to claim 1, wherein the intermediary does not issue certificates.

64. A method according to claim 1, wherein the first other entity is a certification authority.

65. A method according to claim 1, wherein the deduced information is authenticated by being posted in a read-only file that is writable only by at least one of:the witness and the intermediary.

66. A method according to claim 1, wherein the authenticated certificate information includes a hierarchical certificate and wherein the authenticated deduced information includes a reissued certificate.

67. A method according to claim 66, wherein the reissued certificate includes at least one of:a digital signature of the witness and a digital signature of the witness together with a certificate for a public key of the witness.

68. A method according to claim 66, wherein the reissued certificate expires when the hierarchical certificate expires.

69. A method according to claim 66, wherein the reissued certificate contain less bits than the hierarchical certificate.

70. A method according to claim 66, wherein the reissued certificate contains less hierarchical certificate information than the hierarchical certificate.

71. A method according to claim 70, wherein the reissued certificate does not contain at least one digital signature contained in the hierarchical certificate.

72. A method according to claim 66, wherein the reissued certificate is verifiable by verifying the signatures of less authorities than the hierarchical certificate.

73. A method according to claim 66, wherein the reissued certificate is verifiable relative to a universally known public key by verifying the signatures of less authorities than the hierarchical certificate.

74. A method according to claim 73, wherein the reissued certificate and the hierarchical certificate are verifiable relative to the same universally know public key.

75. A method for an intermediary to provide certificate information, comprising the steps of:
(a) receiving from a first other entity authenticated certificate information;
(b) processing at least a portion of the authenticated certificate information to provide deduced information that is not part of the authenticated information;
(c) if the deduced information is consistent with the authenticated certificate information, having a plurality of witnesses construct authenticated deduced information by authenticating at least one of: the deduced information, the deduced information together with date information, and the deduced information together with additional information; and
(d) providing the authenticated deduced information.

76. A method according to claim 75, wherein one of the witnesses is the intermediary.

77. A method according to claim 75, wherein processing is performed by each of the witnesses.

78. A method according to claim 75, wherein at least two of the witnesses produce a digital signature.

79. A method according to claim 78, wherein the digital signatures of the at least two of the witnesses are combined into a single digital signature.

80. A method for an intermediary to provide certificate information, comprising the steps of:
   (a) receiving from a first other entity authenticated certificate information;
   (b) processing at least a portion of the authenticated certificate information to provide deduced information that is not part of the authenticated information;
   (c) if the deduced information is consistent with the authenticated certificate information, having a plurality of witnesses contribute to authenticating at least one of: the deduced information, the deduced information together with date information, and the deduced information together with additional information; and
   (d) providing the authenticated deduced information.

81. A method according to claim 80, wherein at least two of the witnesses have a portion of a secret signing key.

82. A method according to claim 80, further comprising the step of:
   (e) having at least two of the witnesses contribute a digital signature of at least one of: the deduced information, the deduced information together with date information, and the deduced information together with additional information.

83. A method according to claim 82, further comprising the step of:
   (f) combining digital signatures of at least two of the witnesses into a single digital signature.

84. A method according to claim 83, further comprising the step of:
   (g) using a t-out-of-n digital signature scheme to combine the digital signatures.

85. A method according to claim 84, wherein t equals n.

* * * * *

UNITED STATES PATENT AND TRADEMARK OFFICE
CERTIFICATE OF CORRECTION

PATENT NO. : 5,717,758

DATED : February 10, 1998

INVENTOR(S) : Silvio Micali

It is certified that error appears in the above-identified patent and that said Letters Patent is hereby corrected as shown below:

Column 16, line 2, change "ties" to --files--.

Column 16, line 2, change "fries" to --files--.

Column 16, line 4, change "fries" to --files--.

Column 16, line 5, change "fries" to --files--.

Column 16, line 15, change "tie" to --file--.

Column 16, line 19, change "tie" to --file--.

Column 16, line 28, change "tie" to --file--. (two instances)

Signed and Sealed this

Second Day of February, 1999

Attest:

Attesting Officer

*Acting Commissioner of Patents and Trademarks*

UNITED STATES PATENT AND TRADEMARK OFFICE
CERTIFICATE OF CORRECTION

PATENT NO.    :    5,717,758

DATED         :    February 10, 1998

INVENTOR(S)   :    Silvio Micali

It is certified that error appears in the above-identified patent and that said Letters Patent is hereby corrected as shown below:

On the title page
The inventor's name at the top left hand corner should be changed from "Micall" to --Micali--.

Page 1, column 1, the inventor's name should be changed from "Micall" to --Micali--.

Title Page, item 60 add reference to --provisional application no. 60/006,143, November 2, 1995.--

Signed and Sealed this

Thirty-first Day of August, 1999

Attest:

Q. TODD DICKINSON

*Attesting Officer*     *Acting Commissioner of Patents and Trademarks*

(12) EX PARTE REEXAMINATION CERTIFICATE (7599th)
United States Patent
Micali

(10) Number: US 5,717,758 C1
(45) Certificate Issued: Jul. 13, 2010

(54) WITNESS-BASED CERTIFICATE REVOCATION SYSTEM

(75) Inventor: Silvio Micali, Brookline, MA (US)

(73) Assignees: Novomodo, Inc., Somerville, MA (US); Corestreet, Ltd., Somerville, MA (US)

Reexamination Request:
No. 90/007,217, Sep. 22, 2004

Reexamination Certificate for:
Patent No.: 5,717,758
Issued: Feb. 10, 1998
Appl. No.: 08/763,536
Filed: Dec. 9, 1996

Certificate of Correction issued Feb. 2, 1999.

Certificate of Correction issued Aug. 31, 1999.

Related U.S. Application Data

(63) Continuation-in-part of application No. 08/636,854, filed on Apr. 23, 1996, now Pat. No. 5,604,804.
(60) Provisional application No. 60/025,128, filed on Aug. 29, 1996, provisional application No. 60/024,786, filed on Sep. 10, 1996, and provisional application No. 60/006,143, filed on Nov. 2, 1995.

(51) Int. Cl.
*G06Q 20/00* (2006.01)
*H04L 9/32* (2006.01)

(52) U.S. Cl. .......................... 713/158; 380/30; 713/157; 713/172; 713/180
(58) Field of Classification Search .................. 713/158, 713/157, 172, 180; 380/30
See application file for complete search history.

(56) References Cited

U.S. PATENT DOCUMENTS

| 5,136,646 | A | * | 8/1992 | Haber et al. | 713/178 |
| 5,136,647 | A | * | 8/1992 | Haber et al. | 713/178 |
| 5,606,617 | A | * | 2/1997 | Brands | 380/30 |
| 5,903,651 | A | | 5/1999 | Kocher | |

* cited by examiner

*Primary Examiner*—Majid A. Banankhah

(57) ABSTRACT

An intermediary provides certificate information by receiving from a first other entity authenticated certificate information, processing at least a portion of the authenticated certificate information to obtain deduced information, if the deduced information is consistent with the authenticated certificate information, having a witness construct authenticated deduced information by authenticating at least one of: the deduced information, the deduced information together with date information, and the deduced information together with additional information, and by providing the authenticated deduced information. The date information may be at least one of: the current date and date information of the authenticated certificate information. The witness may do the processing. The witness may be the intermediary. The authenticated certificate information and/or the authenticated deduced information may include a digital signature, which may be relative to a verification key that is part of an issued certificate and/or may be computed by applying a one-way function to one or more secret values or by iterating a one-way function. The digital signature may keep the witness accountable for the fact that the authenticated deduced information is consistent with the authenticated certificate information.

EX PARTE REEXAMINATION CERTIFICATE ISSUED UNDER 35 U.S.C. 307

THE PATENT IS HEREBY AMENDED AS INDICATED BELOW.

AS A RESULT OF REEXAMINATION, IT HAS BEEN DETERMINED THAT:

The patentability of claims 1–85 is confirmed.

* * * * *